US012654448B2

(12) United States Patent
Kobayashi

(10) Patent No.: US 12,654,448 B2

(45) Date of Patent: Jun. 16, 2026

(54) NOZZLE PLATE, INKJET HEAD, AND IMAGE FORMATION DEVICE

(71) Applicant: Konica Minolta, Inc., Tokyo (JP)

(72) Inventor: Kumi Kobayashi, Kunitachi (JP)

(73) Assignee: Konica Minolta, Inc., Tokyo (JP)

( * ) Notice: Subject to any disclaimer, the term of this patent is extended or adjusted under 35 U.S.C. 154(b) by 186 days.

(21) Appl. No.: 18/571,455

(22) PCT Filed: Jun. 29, 2021

(86) PCT No.: PCT/JP2021/024606

§ 371 (c)(1),
(2) Date: Dec. 18, 2023

(87) PCT Pub. No.: WO2023/276009

PCT Pub. Date: Jan. 5, 2023

(65) Prior Publication Data

US 2024/0278566 A1 Aug. 22, 2024

(51) Int. Cl.
*B41J 2/14* (2006.01)

(52) U.S. Cl.
CPC .... *B41J 2/1433* (2013.01); *B41J 2002/14475* (2013.01)

(58) Field of Classification Search
CPC ... B41J 2/1433; B41J 2/135; B41J 2/16; B41J 2/162; B41J 2002/14475
See application file for complete search history.

(56) References Cited

FOREIGN PATENT DOCUMENTS

JP 2003182072 A * 7/2003
JP 2007152870 A 6/2007

(Continued)

OTHER PUBLICATIONS

Japanese Office Action (JPOA) dated May 13, 2025 for Japanese Patent Application No. 2023-531209; English translation.

(Continued)

*Primary Examiner* — Jason S Uhlenhake

(74) *Attorney, Agent, or Firm* — RANKIN, HILL & CLARK LLP

(57) ABSTRACT

Provided is a nozzle plate including a nozzle hole for discharging a droplet, in which the nozzle hole includes a first flow path, and a second flow path disposed in such a manner as to communicate with the first flow path on a downstream side of the first flow path with respect to a discharge direction of the droplet; in the first flow path, a cross-sectional area orthogonal to the discharge direction on a most upstream side in the discharge direction is larger than a cross-sectional area orthogonal to the discharge direction on a most downstream side; in a cross section including a center axis of the nozzle hole and parallel to the discharge direction; an inclination of a straight line connecting an end on the most upstream side and an end on the most downstream side of a wall surface of the second flow path disposed on one side with respect to the center axis with respect to the discharge direction is smaller than an inclination of a straight line connecting an end on the most upstream side and an end on the most downstream of the wall surface of the first flow path disposed on the one side with respect to the discharge direction; and a minimum cross-sectional area $S_A$ of the first flow path and a minimum cross-sectional area $S_B$ of the second flow path satisfy a relationship of expression (1).

$$S_A > 13S_B \quad (1)$$

16 Claims, 10 Drawing Sheets

(56) References Cited

FOREIGN PATENT DOCUMENTS

| | | | |
|---|---|---|---|
| JP | 2010131909 | A | 6/2010 |
| JP | 2010267951 | A | 11/2010 |
| JP | 2012000785 | A | 1/2012 |
| JP | 2017094636 | A | 6/2017 |
| WO | 2018047576 | A1 | 3/2018 |

OTHER PUBLICATIONS

International Search Report (ISR) dated Sep. 21, 2021 issued in PCT/JP2021/024606 and its English translation.

Written Opinion of the International Searching Authority dated Sep. 21, 2021 issued in PCT/JP2021/024606 and its English translation.

Japanese Office Action (JPOA) dated Nov. 4, 2025 for Japanese Patent Applicaion No. 2023-531209; English machine translation.

* cited by examiner

NOZZLE PLATE, INKJET HEAD, AND IMAGE FORMATION DEVICE

TECHNICAL FIELD

The present invention relates to a nozzle plate, an inkjet head, and an image formation device.

BACKGROUND ART

An inkjet head used in an inkjet printer or the like includes a nozzle plate having a large number of minute nozzle holes on a discharge surface of liquid droplets (ink).

Such a nozzle plate includes, for example, as described in Patent Literature 1, a flow path having a tapered shape and a flow path having a wall surface parallel to a discharge direction of droplet.

CITATION LIST

Patent Literature

Patent Literature 1: JP 2010-267951

SUMMARY OF INVENTION

Technical Problem

However, when the inkjet head using the conventional nozzle plate as described in Patent Literature 1 is continuously driven, air is entrained in the inkjet head at the time of drawing ink that occurs immediately before discharging the ink, and discharge stability may be deteriorated.

The present invention has been made in view of the above circumstances, and an object thereof is to provide a nozzle plate, an inkjet bead, and an image formation device capable of suppressing entrainment of air into the inkjet bead.

Solution to Problem

In order to solve the above problem, a nozzle plate according to an embodiment of the present invention includes a nozzle hole for discharging a droplet, in which the nozzle hole includes a first flow path, and a second flow path disposed in such a manner as to communicate with the first flow path on a downstream side of the first flow path with respect to a discharge direction of the droplet; in the first flow path, a cross-sectional area orthogonal to the discharge direction on a most upstream side in the discharge direction is larger than a cross-sectional area orthogonal to the discharge direction on a most downstream side; in a cross section including a center axis of the nozzle hole and parallel to the discharge direction; an inclination of a straight line connecting an end on the most upstream side and an end on the most downstream side of a wall surface of the second flow path disposed on one side with respect to the center axis with respect to the discharge direction is smaller than an inclination of a straight line connecting an end on the most upstream side and an end on the most downstream of the wall surface of the first flow path disposed on the one side with respect to the discharge direction; and a minimum cross-sectional area $S_A$ of the first flow path and a minimum cross-sectional area $S_B$ of the second flow path satisfy a relationship of expression (1).

$$S_A > 13S_B \qquad (1)$$

Further, in order to solve the above problem, an inkjet head according to one embodiment of the present invention includes the nozzle plate.

Further, in order to solve the above problems, an image formation device according to the one embodiment of the present invention includes the inkjet head.

Advantageous Effects of Invention

According to the present invention, a nozzle plate, an inkjet head, and an image formation device capable of improving discharge stability are provided.

DESCRIPTION OF EMBODIMENTS

Figure 1:
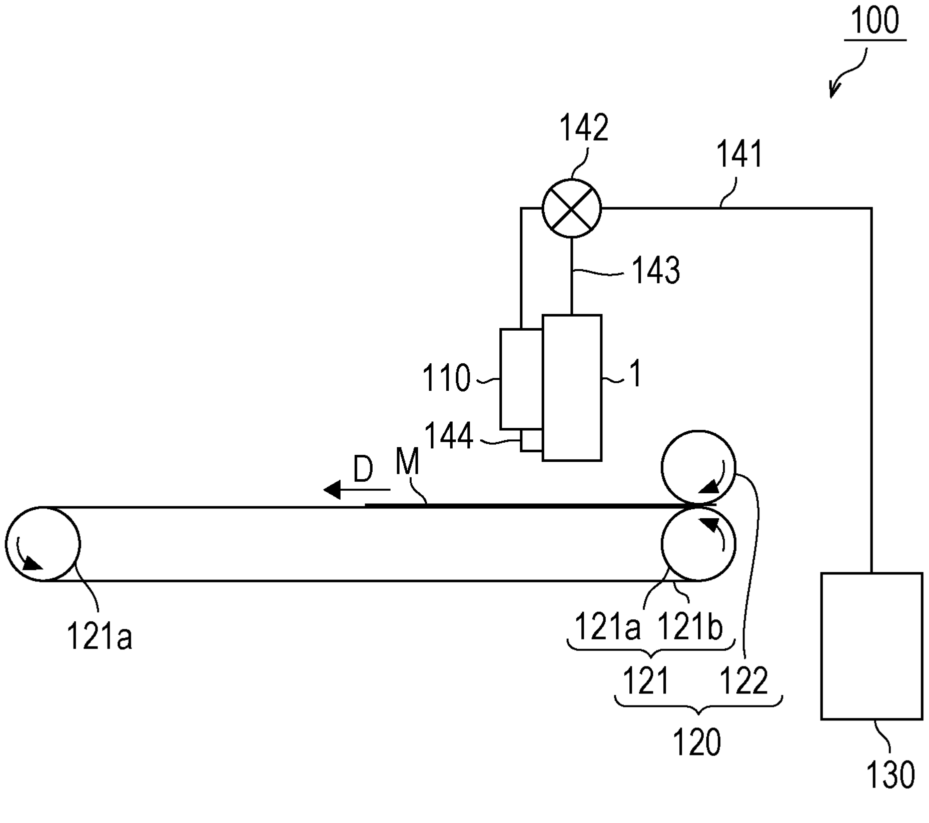
FIG. 1 is a schematic diagram illustrating an overall configuration of an image formation device according to the one embodiment of the present invention.

Hereinafter, embodiments of the present invention will be described in detail with reference to the drawings. Note that, in the drawings, common members are denoted by the same reference numerals. Further, the present invention is not limited to the following embodiments.

(Image Formation Device)

FIG. 1 is a diagram schematically illustrating a configuration of an image formation device 100 according to a first embodiment.

As illustrated in FIG. 1, the image formation device 100 includes an inkjet head 1, an ink supplying device 110, a conveyance device 120, and a main tank 130.

The inkjet head 1 has a plurality of nozzles for discharging ink droplets onto a recording medium M such as a paper sheet as a printing target. For example, the inkjet head 1 is configured so that a plurality of types of inks having different colors is supplied to respective specific nozzles.

The inkjet head 1 is arranged to be scannable in a direction crossing a conveyance direction D of the recording medium M on which an image is to be formed by, for example, a scanning method. Details of the configuration of the inkjet head 1 will be described later. Note that the inkjet head 1 may be arranged by a line method.

In the present embodiment, the type of ink discharged by the inkjet head 1 is not particularly limited, and is, for example, an active ray-curable ink, a solvent-based ink, a water-based ink, or a hot melt ink.

The conveyance device 120 is a device for conveying the recording medium M to the inkjet head 1. The conveyance device 120 includes, for example, a belt conveyor 121 and a rotatable feed roller 122. The belt conveyor 121 includes a plurality of rotatable pulleys 121*a* and an endless belt 121*b* stretched over the pulleys 121*a*. The feed roller 122 is disposed at a position facing the pulley 121*a* on the upstream side in the conveyance direction D of the recording medium M so as to pinch the belt 121*b* and the recording medium M and feed the recording medium M onto the belt 121*b*.

The ink supplying device 110 is disposed integrally with the inkjet head 1. The ink supplying device 110 is arranged for each type of ink. For example, when inks of four colors of yellow (Y), magenta (M), cyan (C), and black (K) are used, four ink supplying devices 110 are arranged in the inkjet head 1.

Each ink supplying device 110 is supplied with the ink in the main tank 130 through a pipe 141 and a valve 142 connected to the main tank 130. Further, each ink supplying device 110 communicates with a common ink chamber 2 to be described later of the inkjet head 1 via a pipe 144, and is connected to be able to supply the ink of each color to an ink supply port 2*a* of the desired common ink chamber 2.

The inkjet head 1 is also connected to the main tank 130 by a bypass pipe 143 branching from the pipe 141. At a branch point between the pipe 141 and the bypass pipe 143, the valve 142 capable of switching and setting a flow path of ink to one or both of the pipe 141 and the bypass pipe 143 is disposed. Each of the pipe 141, the pipe 144, and the bypass pipe 143 is, for example, a flexible tube. The valve 142 is, for example, a three-way valve.

The main tank 130 is a tank for storing ink to be supplied to the inkjet head 1. The main tank 130 is disposed separately from the inkjet head 1. The main tank 130 includes, for example, a stirring device (not illustrated). The main tank 130 can be appropriately determined according to the image forming performance, size, and the like of the image formation device 100. For example, when the image forming speed of the image formation device is 1 to 3 $m^2$/min, the capacity of the main tank 130 is, for example, 1 L.

(Inkjet Head)

Figure 2:
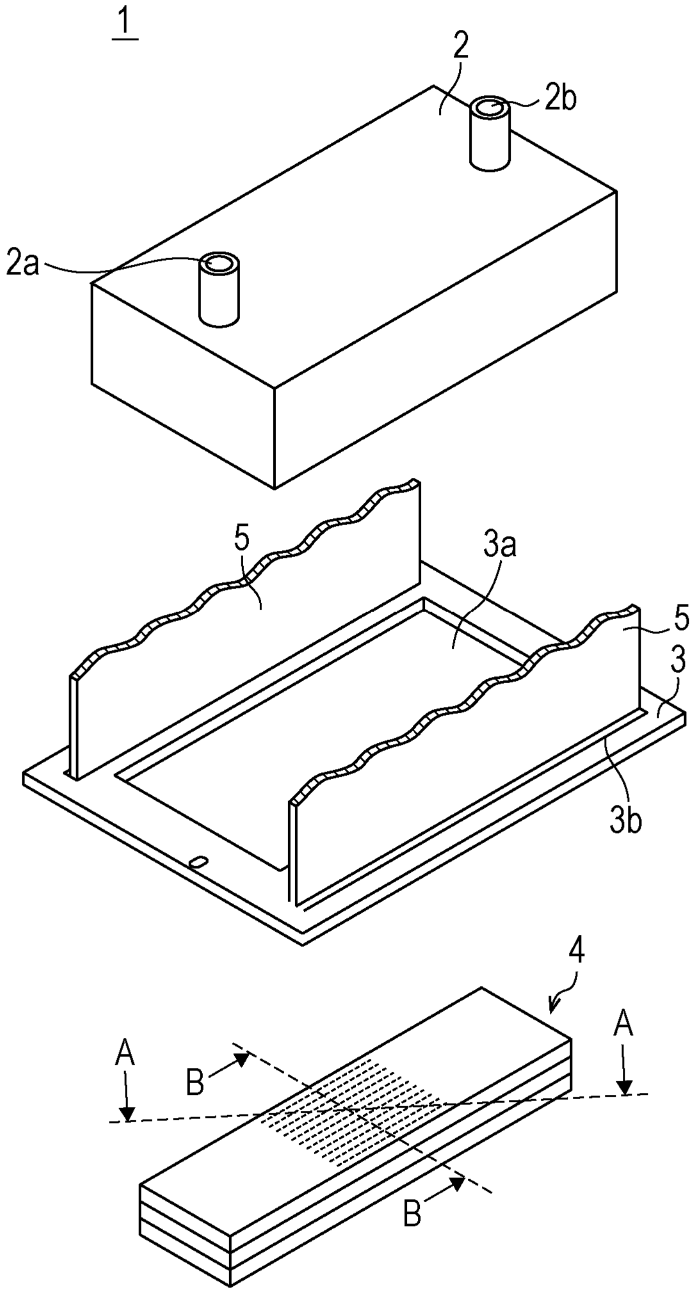
FIG. 2 is an exploded perspective view illustrating an outline of an inkjet head according to the one embodiment of the present invention.

FIG. 2 is an exploded perspective view illustrating an outline of the inkjet head 1 used in the image formation device 100 described above. As illustrated in FIG. 2, the inkjet head 1 includes the common ink chamber 2, a holding unit 3, and a head chip 4.

The common ink chamber 2 is formed in a hollow substantially rectangular parallelepiped shape, and one surface facing the holding unit 3 is opened. An ink supply port 2*a* for supplying ink of the ink supplying device 110 and an ink discharge port 2*b* for discharging ink to the ink supplying device 110 are provided on one surface facing the opening of the common ink chamber 2. The common ink chamber 2 includes a filter therein, removes foreign substances from the ink supplied from the ink supply port 2*a* by the filter, and finely crushes air bubbles contained in the ink.

The holding unit 3 is formed in a substantially flat plate shape having an opening 3*a* at a substantially center, and is disposed so as to cover the opening of the common ink chamber 2. Thus, the common ink chamber 2 is connected to one surface of the holding unit 3 so as to cover the opening 3*a*. Further, the head chip 4 is connected to the other surface of the holding unit 3 so as to cover the opening 3*a*. The holding unit 3 allows the common ink chamber 2 and the head chip 4 to communicate with each other through the opening 3*a*.

An insertion hole 3*b* is provided in an outer peripheral portion of the holding unit 3. A flexible wiring board 5 is inserted into the insertion hole 3*b*. One end of the flexible wiring board 5 is connected to the head chip 4 described later. Further, the other end of the flexible wiring board 5 is inserted through the insertion hole 3*b* provided in the holding unit 3 from the other surface of the holding unit 3 and drawn out toward the common ink chamber 2.

Figure 3A:
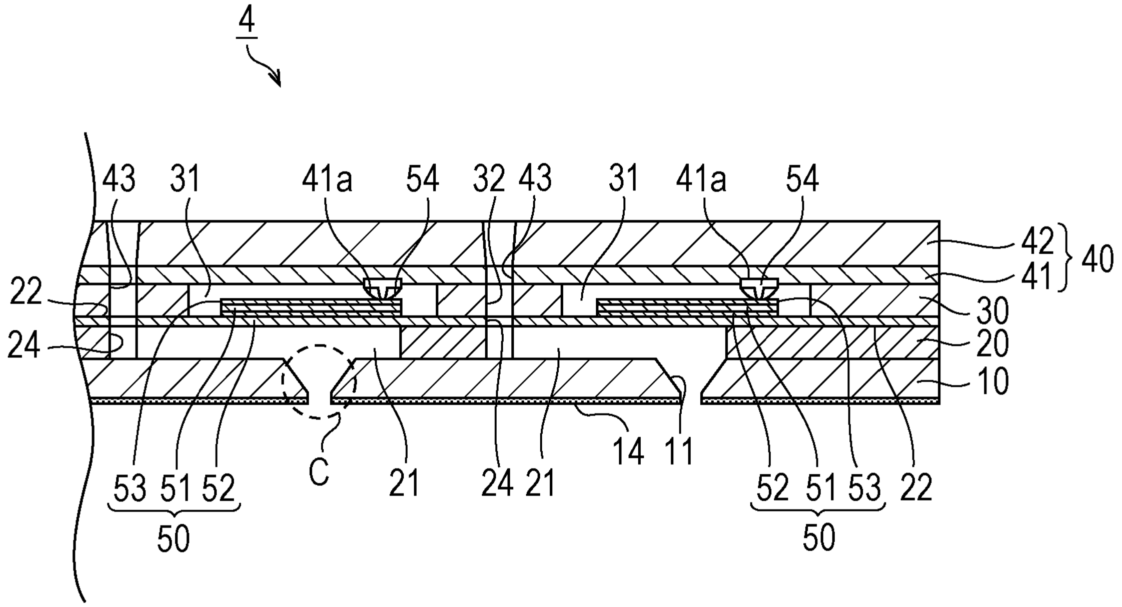
FIG. 3A is a cross-sectional view taken along line A-A in a head chip of FIG. 2.
Figure 3B:
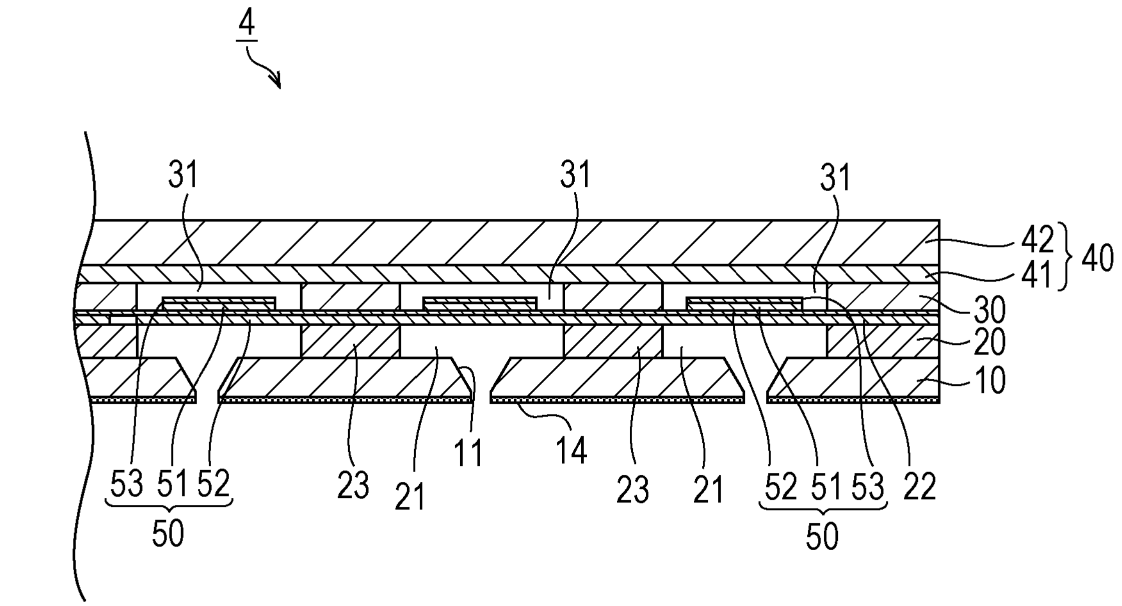
FIG. 3B is a cross-sectional view taken along line B-B in the head chip of FIG. 2.

FIG. 3A is a cross-sectional view taken along line A-A in FIG. 2 illustrating an outline of the head chip 4 included in the inkjet head 1 described above, and FIG. 3B is a cross-sectional view taken along line B-B in FIG. 2 illustrating an outline of the head chip 4 included in the inkjet head 1 described above.

The head chip 4 includes a nozzle plate 10, a pressure chamber forming plate 20, a drive plate 30, and a wiring substrate 40. Further, in the head chip 4, the nozzle plate 10, the pressure chamber forming plate 20, the drive plate 30, and the wiring substrate 40 are stacked in this order from an ink discharge surface side.

Figure 9:
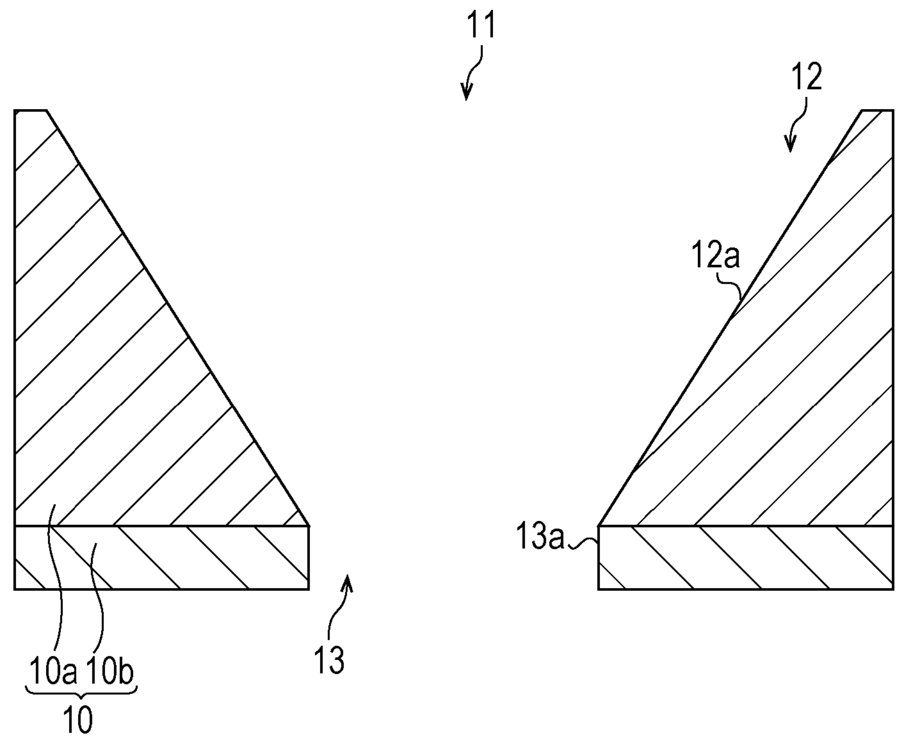
FIG. 9 is a cross-sectional view illustrating a nozzle plate according to a first modification of the present embodiment.

A plurality of nozzle holes 11 is formed in the nozzle plate 10. The nozzle holes 11 penetrate from one surface to the other surface of the nozzle plate 10. The nozzle holes 11 discharge ink droplets (hereinafter simply referred to as droplets) supplied from the common ink chamber 2 to the outside from discharge ports. Further, a plurality of (for example, 500 to 2000) nozzle holes 11 is provided in the nozzle plate 10, and is arranged in a matrix. The nozzle holes 11 each communicate with a pressure chamber 21 formed in the pressure chamber forming plate 20. Note that, in the present embodiment, the nozzle holes 11 may be formed by two substrates as illustrated in FIG. 9 (described later).

A liquid-repellent film 14 is formed on the ink-discharge-side surface of the nozzle plate 10. The material contained in the liquid-repellent film 14 is not particularly limited, and is, for example, a fluorine-based resin. Further, the thickness of the liquid-repellent film 14 is not particularly limited, but is, for example, equal to or more than 1 nm and less than 100 nm.

The pressure chamber forming plate 20 includes a plurality of pressure chambers 21 and a diaphragm 22. The pressure chambers 21 are provided at positions corresponding to the nozzle holes 11 of the nozzle plate 10. Further, the pressure chambers 21 penetrate from one surface to the other surface of the pressure chamber forming plate 20. The pressure chambers 21 apply a discharge pressure to the ink discharged from the nozzle holes 11 by volume fluctuation thereof. Further, a partition wall 23 is formed between the plurality of pressure chambers 21. In the present embodiment, the entire partition wall 23 is formed by a metal capable of electroplating such as nickel (Ni). Thus, the rigidity of the partition wall 23 can be further increased, and the inkjet head 1 can have a stable structure that is hardly broken by vibration. Note that the nozzle plate 10 and the pressure chamber forming plate 20 may be bonded to each other.

The diaphragm 22 is disposed so as to cover openings of the pressure chambers 21 on a side opposite to the nozzle plate 10. The diaphragm 22 is provided with a second communication hole 24 communicating with the pressure chamber 21. The drive plate 30 is disposed on one surface of the diaphragm 22 opposite to the one surface on the pressure chamber 21 side.

The drive plate 30 includes a space 31 and a third communication hole 32 communicating with the second communication hole 24. The space 31 is disposed at a position facing the pressure chamber 21 with the diaphragm 22 interposed therebetween. An actuator 50 is accommodated in the space 31.

The actuator 50 includes a piezoelectric element 51, a first electrode 52, and a second electrode 53. The first electrode 52 is stacked on one surface of the diaphragm 22. Note that an insulating layer may be disposed between the first electrode 52 and the diaphragm 22. The piezoelectric element 51 is stacked on the first electrode 52, and is disposed for each pressure chamber 21 (for each channel) at a position facing the pressure chamber 21 with the diaphragm 22 and the first electrode 52 interposed therebetween.

The piezoelectric element 51 is formed by a material that deforms when a voltage is applied, and is formed by, for example, a ferroelectric material such as lead zirconate titanate (PZT). Further, the second electrode 53 is stacked on a surface of the piezoelectric element 51 opposite to the first electrode 52. The second electrode 53 is connected to a wiring layer 41 provided on the wiring substrate 40 described later via a bump 54. The film thickness of the piezoelectric element 51 is, for example, equal to or less than 10 μm.

The wiring substrate 40 includes the wiring layer 41 and a silicon layer 42 in which the wiring layer 41 is formed on one surface. The wiring layer 41 is connected to the bump 54 provided on the second electrode 53 via a solder 41*a*. Further, an outer edge of the wiring layer 41 is connected to the flexible wiring board 5. Furthermore, the silicon layer 42 is disposed on one surface of the wiring layer 41 opposite to the drive plate 30. The silicon layer 42 is bonded to the holding unit 3.

In addition, the wiring substrate 40 is provided with a fourth communication hole 43 penetrating the wiring layer 41 and the silicon layer 42. The fourth communication hole 43 communicates with the common ink chamber 2 through the third communication hole 32 of the drive plate 30 and the opening 3*a* of the holding unit 3.

In the present embodiment, the fourth communication hole 43 of the wiring substrate 40, the third communication hole 32 of the drive plate 30, and the second communication bole 24 of the diaphragm 22 communicating with each other constitute an inlet serving as a flow path for supplying the ink in the common ink chamber 2 to the pressure chamber 21. The inlet plays a role of reducing a flow path resistance (flow rate) of the ink flowing into the pressure chamber 21 from the common ink chamber 2. Furthermore, an outlet for discharging the ink in the pressure chamber 21 toward the recording medium 150 is configured by the nozzle hole 11 of the nozzle plate 10.

In the inkjet head 1 having such a configuration, the ink stored in the common ink chamber 2 passes through the inlet (that is, the fourth communication hole 43, the third communication hole 32, and the second communication hole 24) and flows into the pressure chamber 21. Then, when a voltage is applied between the first electrode 52 and the second electrode 53, the piezoelectric element 51 is deformed (vibrated), and the diaphragm 22 is deformed (vibrated) with the deformation of the piezoelectric element 51. When the diaphragm 22 is deformed (vibrated), pressure for discharging ink is generated in the pressure chamber 21. Due to the generation of such pressure, the ink in the pressure chamber 21 is pushed out to the outlet (that is, the nozzle hole 11), and is discharged from a front end (nozzle opening) of the nozzle hole 11 toward the recording medium 150.

Note that, in the present embodiment, the inkjet head 1 only needs to include the nozzle plate 10, and may be a piezoelectric inkjet head or a thermal inkjet head in which the piezoelectric element SI constitutes a wall of the pressure chamber 21.

(Nozzle Plate)

Figure 4:
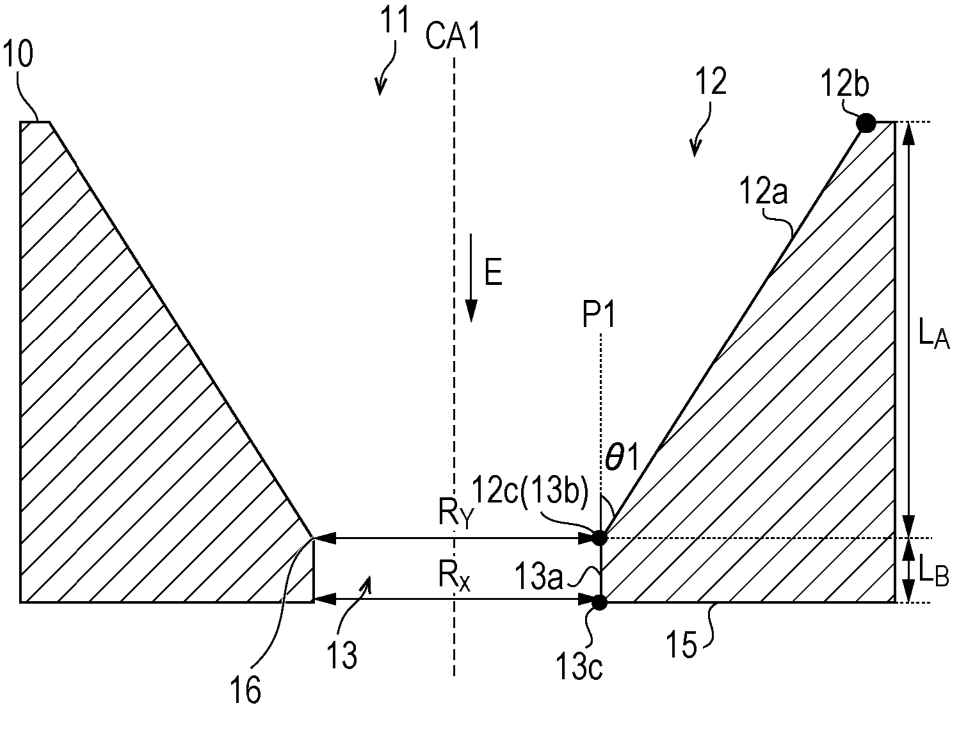
FIG. 4 is a partially enlarged view of a region C in FIG. 3A.

FIG. 4 is a partially enlarged view of a region C in FIG. 3A, illustrating a cross-sectional shape of the nozzle plate 10.

As illustrated in FIG. 4, the nozzle hole 11 of the nozzle plate 10 includes a first flow path 12 and a second flow path 13 arranged in such a manner as to communicate with the first flow path 12 on the downstream side of the first flow path 12 with respect to the discharge direction of the droplet (arrow E in FIG. 4), and a cross-sectional area orthogonal to the discharge direction on the most upstream side in the discharge direction of the first flow path 12 is larger than the cross-sectional area on the most downstream side. In the present embodiment, the first flow path 12 and the second flow path 13 of the nozzle plate 10 are formed by processing one substrate.

Figure 5A:
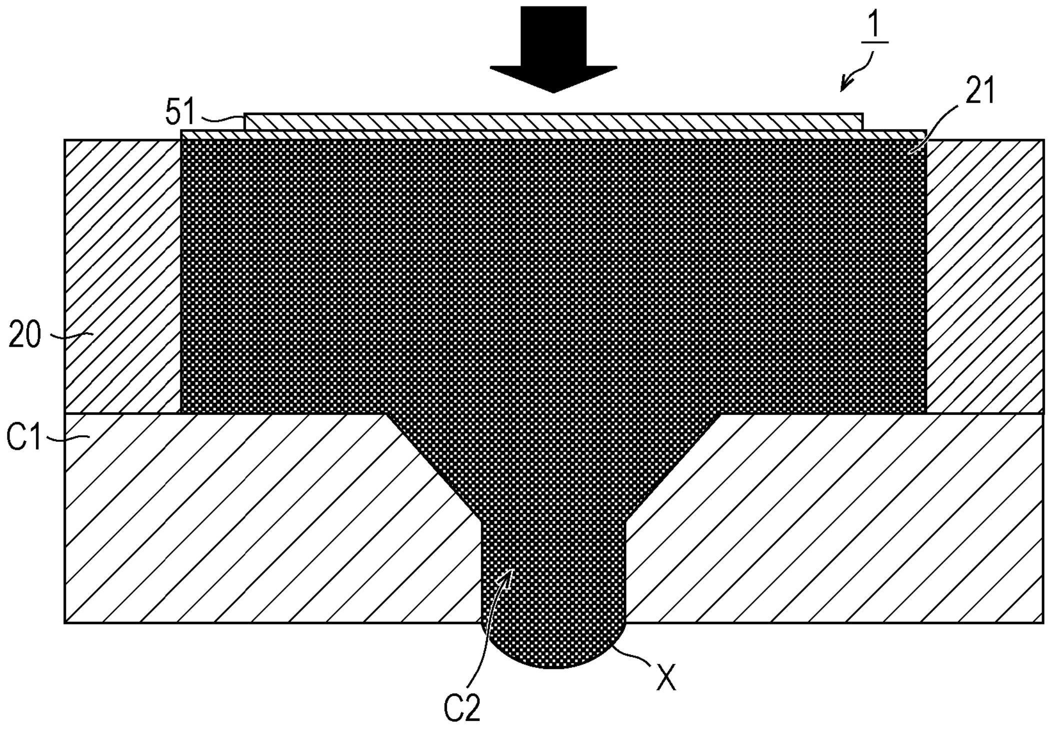
FIGS. 5A and 5B are cross-sectional views schematically illustrating a state at a time of drawing a droplet in the inkjet head including a conventional nozzle plate.
Figure 5B:
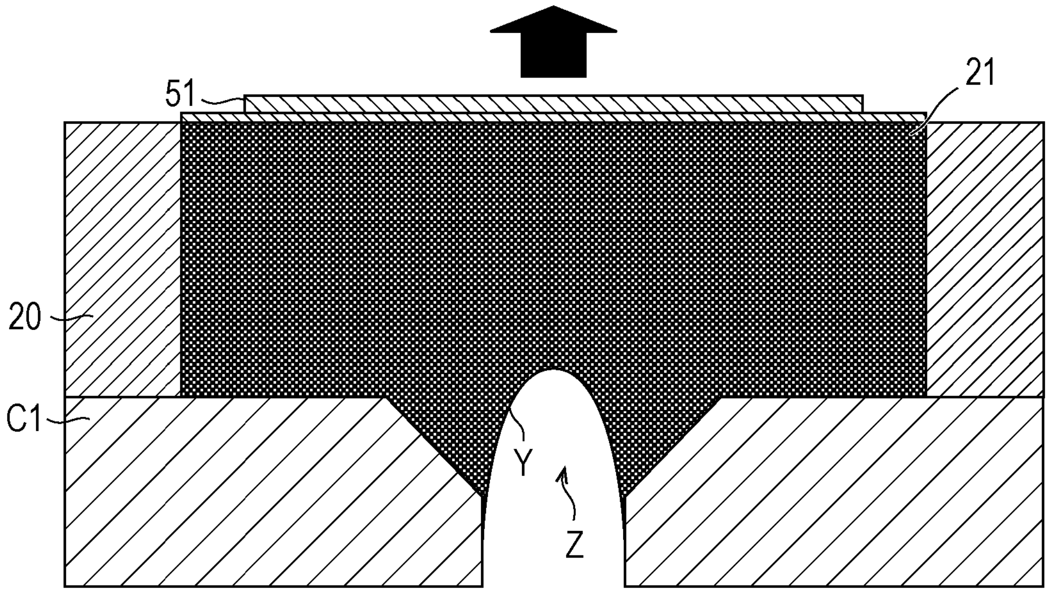

FIGS. 5A and 5B are cross-sectional views schematically illustrating main parts of an inkjet head 1 including a conventional nozzle plate C1 as described in Patent Literature 1. In the inkjet head 1 (FIG. 5A), the piezoelectric element 51 is vibrated to change the pressure in the pressure chamber 21 to discharge an ink droplet X. At this time, the pressure chamber 21 is depressurized (the volume of the pressure chamber increases) immediately before the ink droplets X are discharged, and thus the ink is drawn from the nozzle hole C2 toward the inside of the pressure chamber (FIG. 5B). When the ink is drawn in, because a concave liquid surface (meniscus) Y is formed in the nozzle hole C2 due to surface tension of the ink, there is a possibility that air Z is entrained into the pressure chamber 21 (FIG. 5B). When the air is entrained in the pressure chamber 21, a force for pushing out the ink in the pressure chamber 21 (a force for contracting the volume of the pressure chamber 21) by the piezoelectric element 51 reaches the air Z at the time of next discharging the droplets. At this time, if an air bubble is contained in the ink and the droplets are to be discharged as they are, there is a possibility that discharge stability is deteriorated, such as the occurrence of nozzle missing or the droplets cannot land at a predetermined position due to discharge disturbance.

Figure 6A:
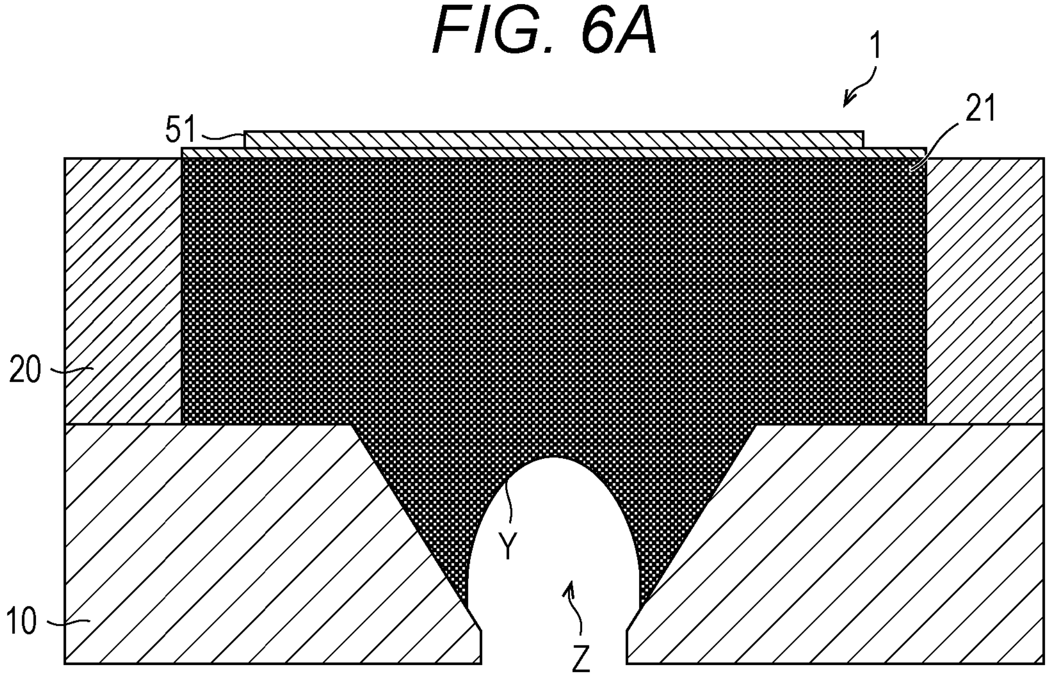
FIG. 6A is a cross-sectional view schematically illustrating a state at a time of drawing a droplet in the inkjet head including a nozzle plate according to the one embodiment of the present invention.
Figure 6B:
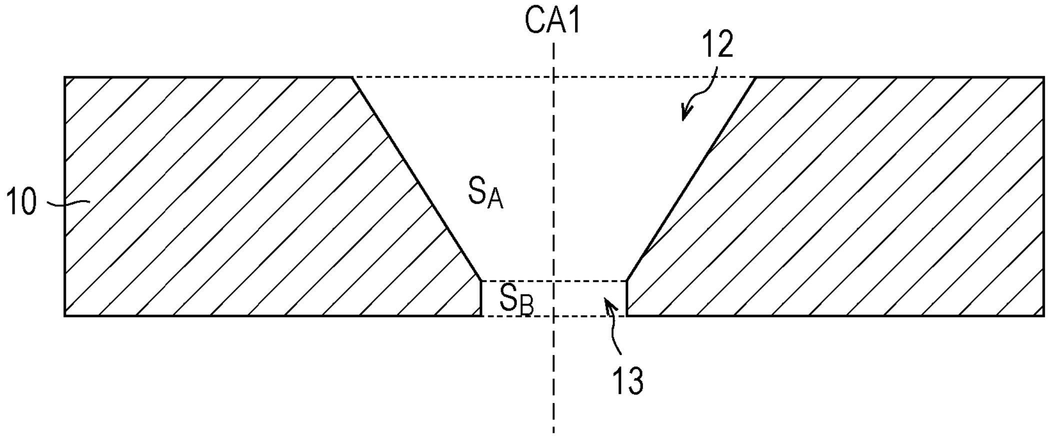
FIG. 6B is a cross-sectional view illustrating cross-sectional areas $S_A$ and $S_B$ of the nozzle plate according to the one embodiment of the present invention.

Accordingly, the present inventors have considered that the air is less likely to be entrained in the pressure chamber 21 by sufficiently increasing the volume of the first flow path 12. Then, as a result of intensive studies, the present inventors have found that, in a cross section including a center axis CAL of the nozzle hole 11 and parallel to the discharge direction of the droplet, by a minimum cross-sectional area $S_A$ of the first flow path 12 and a minimum cross-sectional area $S_B$ of the second flow path 13 satisfying the relationship of expression (1), it is possible to suppress the air from being entrained into the pressure chamber 21 at the time of drawing the droplet, and to improve the discharge stability of the droplets (FIGS. 6A and B). Here, in the present description, the "center axis CA1 of the nozzle hole 11" means a straight line connecting a center (center of gravity) of a cross section of the first flow path 12 orthogonal to the discharge direction of the droplet and a center (center of gravity) of a cross section of the second flow path 13 orthogonal to the discharge direction.

$$S_A > 13S_B \quad (1)$$

The reason why entrainment of air into the pressure chamber 21 can be suppressed when the first flow path 12 and the second flow path 13 satisfy the relationship of the expression (1) is not clear, but it is considered as follows.

In the first flow path 12, since a cross-sectional area orthogonal to the discharge direction on the most upstream side in the discharge direction of the droplet is larger than the orthogonal cross-sectional area on the most downstream side, the area of the cross section orthogonal to the discharge direction increases toward the pressure chamber 21. At this time, when the first flow path 12 has a size that satisfies the expression (1), it is considered that the area of the cross section of the first flow path 12 orthogonal to the discharge direction can be sufficiently increased, and a volume sufficient to suppress the air Z entrained at the time of drawing the droplet from reaching the inside of the pressure chamber 21 due to the pressure loss can be ensured.

Further, in the nozzle plate as described in Patent Literature 1, in a case where the shapes and dimensions of the flow path vary due to manufacturing and processing, the above-described entrainment of air may be more likely to occur, and the discharge stability may be further deteriorated.

On the other hand, in the nozzle plate in the present embodiment, by the first flow path 12 and the second flow path 13 having shapes and dimensions that satisfy the expression (1), the volume of the first flow path 12 can be sufficiently ensured, so that adverse effect by the air entrainment caused by variations in shapes and dimensions due to manufacturing and processing of the nozzle plate can be sufficiently compensated by the first flow path 12 having the sufficient volume. Therefore, it is possible to suppress a decrease in discharge stability caused by variations due to the manufacturing and processing as compared with the conventional nozzle plate.

As described above, in the first flow path 12, the cross-sectional area orthogonal to the discharge direction on the most upstream side in the discharge direction of the droplet is larger than the orthogonal cross-sectional area on the most downstream side. In the present embodiment, the first flow path 12 has a tapered shape in which the orthogonal cross-sectional area decreases at a constant rate toward the discharge direction. Thus, in the first flow path 12, the area of the cross section orthogonal to the discharge direction can be enlarged toward the pressure chamber 21. Further, at the time of discharging droplets, the pressure in the first flow path 12 is likely to be evenly applied to the droplets, and disturbance of shapes of the droplets can be further suppressed. Furthermore, due to the tapered shape, it is possible to sufficiently suppress a decrease in robustness of the nozzle plate due to variations in shapes and dimensions during manufacturing and processing.

The shape of the cross section of the first flow path 12 orthogonal to the discharge direction of the droplet is not particularly limited, and is, for example, a circle, an ellipse, an elongated hole, a rectangle, or a rhombus. In the present embodiment, the shape of the cross section of the first flow path 12 orthogonal to the discharge direction of the droplet is an elongated bole shape.

In a cross section including the center axis CA1 of the nozzle hole 11 and parallel to the discharge direction of the droplet, a straight line connecting an end 12*b* on the most upstream side and an end 12*c* on the most downstream side of a wall surface 12*a* of the first flow path 12 disposed on one side with respect to the center axis CA1 has an inclination with respect to the discharge direction. In the present description, among angles formed by a straight line P1 parallel to the discharge direction of the droplet and a straight line connecting the end 12*b* on the most upstream side and the end 12*c* on the most downstream side of the wall surface 12*a* of the first flow path 12, an angle that is an acute angle (θ1 in FIG. 54) is referred to as an "inclination of the wall surface 12*a* of the first flow path 12".

The inclination of the wall surface 12*a* of the first flow path 12 is preferably equal to or more than 5° and equal to or less than 20°. When the inclination of the wall surface 12*a* of the first flow path is equal to or more than 5°, the cross-sectional area orthogonal to the discharge direction on the most upstream side in the discharge direction of the droplet can be made sufficiently larger than the orthogonal cross-sectional area on the most downstream side, and thus it is possible to more sufficiently suppress the entrainment of air into the pressure chamber 21 due to the pressure loss and to further enhance the discharge stability. When the inclination of the wall surface 12*a* of the first flow path is equal to or less than 20°, the discharge amount of droplets can be more appropriately adjusted.

A length $L_A$ of the first flow path 12 in the discharge direction of the droplet is not particularly limited, but is preferably equal to or more than 55 μm and equal to or less than 115 μm. When the length $L_A$ of the first flow path 12 in the discharge direction is within the above range, a sufficient distance from the front end of the nozzle hole 11 to the pressure chamber 21 can be ensured, it is possible to make it difficult for air to be entrained into the pressure chamber 21 at the time of drawing the droplet, and space saving of the nozzle plate 10 in the inkjet head 1 can be achieved.

The minimum cross-sectional area $S_A$ of the first flow path 12 in the cross section including the center axis CA1 of the nozzle hole 11 and parallel to the discharge direction of the droplet is not particularly limited as long as the size satisfies the expression (1), but is preferably equal to or more than 1300 μm$^2$ and equal to or less than 7000 μm$^2$, more preferably equal to or more than 1600 μm$^2$ and equal to or less than 7000 μm$^2$, and still more preferably equal to or more than 2400 μm$^2$ and equal to or less than 5000 μm$^2$ from the viewpoint of more sufficiently suppressing the entrainment of air into the pressure chamber 21.

The second flow path 13 is disposed on the downstream side of the first flow path 12 with respect to the discharge direction of the droplet so as to communicate with the first flow path 12. Further, in the cross section including the center axis CA1 of the nozzle hole 11 and parallel to the discharge direction of the droplet, an inclination with respect to the discharge direction of a straight line connecting an end 13*b* on the most upstream side and an end 13*c* on the most downstream side in the discharge direction of the wall surface 13*a* of the second flow path 13 arranged on one side with respect to the center axis CA1 is smaller than the inclination of the wall surface 12*a* of the first flow path 12. In the present description, an angle that is an acute angle among angles formed by the straight line P1 parallel to the discharge direction of the droplet and a straight line connecting the end 13*b* on the most upstream side and the end 13*c* on the most downstream side of the wall surface 13*a* of the second flow path 13 is referred to as an "inclination of the wall surface 13*a* of the second flow path 13". In the present embodiment, the inclination of the wall surface 12*a* of the first flow path 12 is angle θ1 in FIG. 4, the inclination of the wall surface 13*a* of the second flow path 13 is angle θ2 (not illustrated), and angle θ1 and angle θ2 satisfy the relationship of θ1>θ2. Further, in the present embodiment, 0° <θ1<90° and 0° ≤θ2<90° hold.

The inclination (angle θ2) of the wall surface 13*a* of the second flow path 13 is not particularly limited as long as it is smaller than the inclination (angle θ1) of the wall surface 12*a* of the first flow path 12, but is preferably equal to or more than 0° and equal to or less than 10°, more preferably equal to or more than 0° and equal to or less than 5G, and still more preferably 0°. When the angle θ2 is within the above range, the flow direction of the ink is easily aligned with the discharge direction of the droplets in the second flow path 13, and the discharge stability can be further enhanced. Further, since the angle θ2 is within the above range, it is possible to more sufficiently suppress variations in the ejection angle of the droplets due to variations in the shapes and the dimensions of the flow paths due to manufacturing and processing. When the inclination of the wall surface 13*a* of the second flow path 13 is 0°, the wall surface 13*a* of the second flow path 13 is parallel to the discharge direction of the droplet, and the area of the cross section orthogonal to the discharge direction of the second flow path 13 is constant toward the discharge direction. In the present embodiment, the inclination (angle θ2) of the wall surface 13*a* of the second flow path 13 is 0°.

The shape of the cross section of the second flow path 13 orthogonal to the discharge direction of the droplet is not particularly limited, and is, for example, a circle, an ellipse, a rectangle, or a rhombus. In the present embodiment, the shape of the cross section of the second flow path 13 orthogonal to the discharge direction of the droplet is circular. That is, in the present embodiment, the shape of the cross section of the nozzle hole 11 on the most downstream side in the discharge direction of the droplet orthogonal to the discharge direction is circular. In the present embodiment, a minimum width $R_Y$ of the first flow path 12 in the direction orthogonal to the discharge direction is equal to the diameter of the circle of the cross section in the second flow path 13, and thus the end 12*c* on the most downstream side of the wall surface 12*a* of the first flow path 12 in the discharge direction and the end 13*b* on the most upstream side of the wall surface 13*a* of the second flow path 13 in the discharge direction are matched with each other.

A length $L_B$ of the second flow path 13 in the discharge direction of the droplet is not particularly limited, but is preferably equal to or more than 1 μm, preferably equal to or more than 5 μm, and preferably equal to or less than 7 μm. When $L_B$ is equal to or more than 1 μm, in the second flow path 13, a length for bringing the flow direction of the ink close to the discharge direction of the droplet can be ensured, and the discharge stability can be further enhanced.

The sum of the length $L_A$ of the first flow path 12 in the discharge direction of the droplet and the length $L_B$ of the second flow path 13 in the discharge direction of the droplet is preferably equal to or more than 60 μm. Thus, a sufficient distance from the front end of the nozzle hole 11 to the pressure chamber 21 can be ensured, and thus the inclination (angle θ1) of the wall surface 12*a* of the first flow path 12 can be further reduced to make it difficult for air to be entrained into the pressure chamber 21. From the above viewpoint, the sum of $L_A$ and $L_B$ is preferably equal to or more than 60 μm and equal to or less than 120 μm. When the thickness is equal to or less than 120 μm, the pressure loss (fluid resistance) can be reduced, and the ink can be easily ejected. In particular, in a case where a piezoelectric inkjet head is used, the voltage applied at the time of ejecting ink can be lowered.

The length $L_B$ of the second flow path in the discharge direction of the droplet is more preferably equal to or more than 0.01 times and less than 0.1 times, and still more preferably equal to or more than 0.01 times and less than 0.08 times the length $L_A$ of the first flow path in the discharge direction. When $L_B$ is equal to or more than 0.01 times $L_A$, it is possible to ensure a length for bringing the flow direction of the ink close to the discharge direction of the droplets in the second flow path 13. When it is less than 0.1 times, the fluid resistance in the nozzle bole 11 is reduced, and the ink droplets can be easily discharged.

The cross-sectional area $S_B$ of the second flow path 13 in the cross section including the center axis CA1 of the nozzle hole 11 and parallel to the discharge direction of the droplet is not particularly limited as long as it satisfies the expression (1), but is preferably equal to or more than 100 μm² and equal to or less than 400 μm², more preferably equal to or more than 185 μm² and equal to or less than 300 μm², and still more preferably equal to or more than 200 μm² and equal to or less than 250 μm² from the viewpoint of more sufficiently suppressing the entrainment of air into the pressure chamber 21.

In the cross section including the center axis CA1 of the nozzle hole 11 and parallel to the discharge direction of the droplet, the size of the minimum width $R_X$ of the second flow path 13 on the most downstream side in the discharge direction in the direction orthogonal to the discharge direction is not particularly limited, but is preferably equal to or more than 20 μm and equal to or less than 50 μm. Within the above range, the discharge amount of the droplets can be more appropriately adjusted. In the present embodiment, since the wall surface 13*a* of the second flow path 13 is parallel to the discharge direction of the droplet, the size of the minimum width $R_X$ of the second flow path 13 is the same as the minimum width $R_Y$ in the orthogonal direction on the most downstream side in the discharge direction of the first flow path 12.

In the cross section including the center axis CA1 of the nozzle hole 11 and parallel to the discharge direction of the droplet, the length $L_A$ of the first flow path 12 in the discharge direction, the length $L_B$ of the second flow path 13 in the discharge direction, and the $R_X$ in the second flow path 13 preferably satisfy the relationships of the expressions (2) and (3). Thus, the fluid resistance at the time of ink discharge can be reduced, and the ink droplets can be easily discharged.

$$L_A \leq 2R_X \tag{2}$$

$$L_B < 1/2R_X \tag{3}$$

The material contained in the nozzle plate 10 is not particularly limited, but the surface 15 of the nozzle plate 10 on the most downstream side in the direction in which the droplets are discharged is preferably made of stainless steel. In the present description, the surface 15 on the most downstream side in the discharge direction of the nozzle plate 10 refers to a surface on the ink discharge side. In a case where the liquid-repellent film is formed on the nozzle plate 10, it refers to a surface on the ink discharge side among surfaces of the nozzle plate 10 to which the liquid-repellent film is applied. Since the surface 15 on the most downstream side in the discharge direction of the nozzle plate 10 is made of stainless steel, it is possible to suppress the nozzle hole 11 from being damaged by an operation of wiping the ink performed after using the inkjet head 1, and thus it is possible to more sufficiently suppress deterioration of the discharge stability due to the damage of the nozzle hole 11. Note that the nozzle plate 10 may be made of a material other than stainless steel except for the surface 15 on the most downstream side.

A method for forming the first flow path 12 and the second flow path 13 is not particularly limited. Examples of methods of manufacturing the nozzle plate 10 include punching, etching, sandblasting, laser processing, and the like.

Figure 7A:
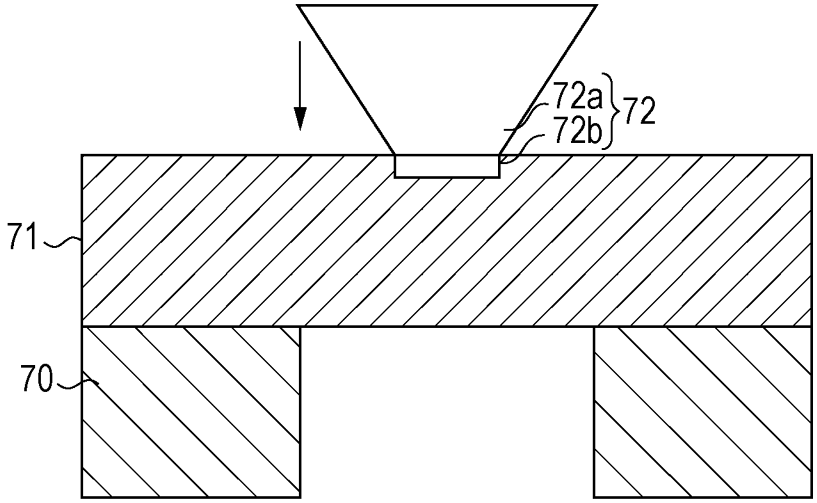
FIGS. 7A to 7C are schematic views illustrating an example of a method for manufacturing a nozzle plate by punching.
Figure 7B:
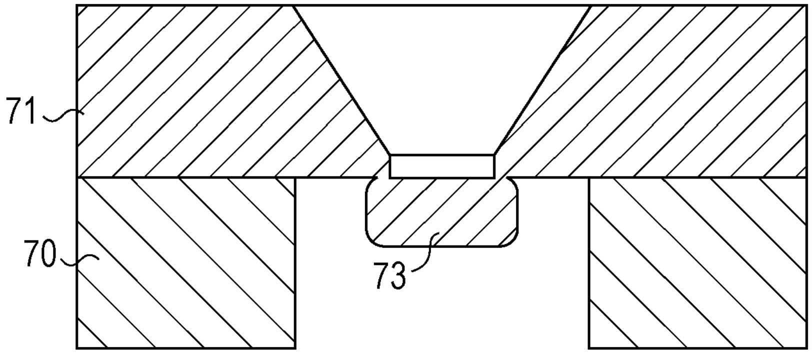
Figure 7C:
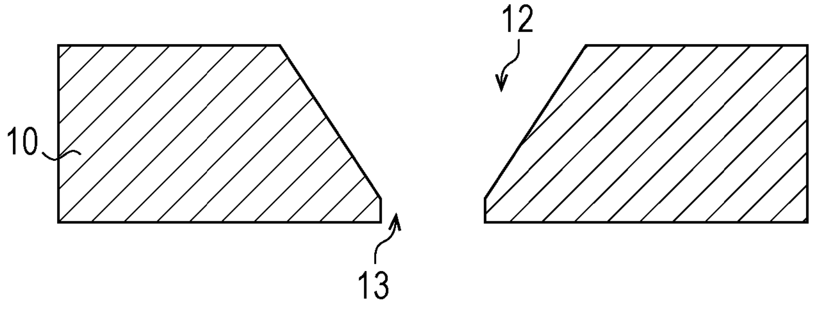

FIGS. 7A to 7C are schematic views illustrating an example of a method for manufacturing the nozzle plate 10 by punching.

As illustrated in FIGS. 7A to 7C, in the case of punching, for example, the nozzle plate 10 can be manufactured by press-fitting the punch 72 into the plate 71 placed on the die 70.

The die 70 functions as a receiving member of the punch 72. The material contained in the die 70 is not particularly limited, and examples thereof include stainless steel and aluminum.

The plate 71 is a substrate serving as a base material of the nozzle plate 10. A surface of the plate 71 on the most downstream side with respect to the direction in which the punch 72 is press-fitted is preferably made of stainless steel.

Figure 8:
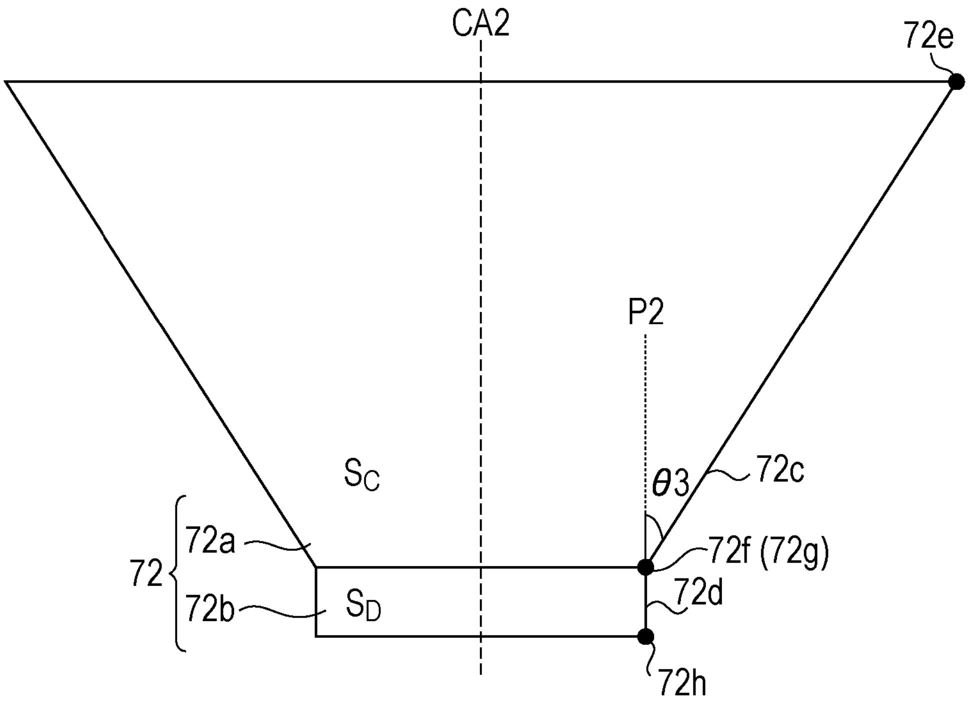
FIG. 8 is a cross-sectional view of a punch, which includes a center axis and is parallel to a direction in which the punch is press-fitted into the plate.

FIG. 8 is a cross-sectional view of the punch 72, which includes a center axis CA2 and is parallel to a direction in which the punch 72 is press-fitted into the plate 71.

The punch 72 includes a first punch portion 72*a* and a second punch portion 72*b* In the first punch portion 72*a*, the cross-sectional area orthogonal to the press-fitting direction on the most upstream side in the direction of press-fitting the punch 72 into the plate 71 is larger than the orthogonal cross-sectional area on the most downstream side. Further, the second punch portion 72*b* is continuous with the first punch portion 72*a* on the downstream side of the first punch portion in the direction in which the punch 72 is press-fitted into the plate 71. The shape of the cross section of the first punch portion 72*a* orthogonal to the direction in which the punch 72 is press-fitted is not particularly limited, and is, for example, an elongated hole shape.

In the cross section including the center axis CA2 of the punch 72 and parallel to the press-fitting direction, a wall surface 72*c* of the first punch portion 72*a* disposed on one side with respect to the center axis CA2 has an inclination with respect to a straight line P2 parallel to the press-fitting direction. In the present description, an angle (θ3 in FIG. 8) that is an acute angle among angles formed by the straight line P2 and a straight line connecting an end 72*e* on the most upstream side and an end 72*f* on the most downstream side of the first punch portion 72*a* in the press-fitting direction is referred to as "inclination of the wall surface 72*c* of the first punch portion 72*a*". The angle θ3 is not particularly limited, but is preferably equal to or more than 3° and equal to or less than 30°.

In the cross section including the center axis CA2 of the punch 72 and parallel to the press-fitting direction, an inclination of a wall surface 72*d* of the second punch portion 72*b* disposed on one side with respect to the center axis CA2 is smaller than the inclination of the wall surface 72*c* of the first punch portion 72*a*. In the present description, an angle that is an acute angle among angles formed by the straight line P2 parallel to the press-fitting direction and a straight line connecting an end 72*g* on the most upstream side and an end 72*h* on the most downstream side of the wall surface 72*d* of the second punch portion in the press-fitting direction is referred to as an inclination of the "wall surface 72*d* of the second punch portion 72*b*". In the present embodiment, the inclination of the wall surface 72*d* of the second punch portion 72*b* is 04 (not illustrated), and the angle θ3 and the angle θ4 satisfy the relationship of θ3>θ4. Further, in the present embodiment, 0°<θ3<90° and 0°≤θ4<90° are satisfied.

The shape of the cross section of the second punch portion 72*b* orthogonal to the direction in which the punch 72 is press-fitted is not particularly limited, but is, for example, circular.

The inclination (angle θ4) of the wall surface 72*d* of the second punch portion 72*b* is not particularly limited as long as it is smaller than the inclination of the wall surface 72*c* of the first punch portion 72*a*, but is preferably equal to or more than 0° and equal to or less than 10°, more preferably equal to or more than 0° and equal to or less than 5°, and still more preferably 0°. In the present embodiment, the inclination of the wall surface 72*d* of the second punch portion 72*b* is 0°.

In the cross section including the center axis CA2 of the punch 72 and parallel to the press-fitting direction, a minimum cross-sectional area $S_C$ of the first punch portion 72*a* and a minimum cross-sectional area $S_D$ of the second punch portion 72*b* satisfy the relationship of the expression (4).

$$S_C > 13S_D \tag{4}$$

Hereinafter, a method of manufacturing the nozzle plate 10 by punching will be sequentially described with reference to FIGS. 7A to 7C.

First, the second punch portion 72*b* of the punch 72 is press-fitted into the plate 71 placed on the die 70 (FIG. 7A). Further, when the first punch portion 72*a* is press-fitted into the plate 71 (FIG. 7B) and the punch 72 is taken out from the plate 71, the first flow path 12 and the second flow path 13, and an expansion portion 73 with a bottom are formed in the plate 71. Finally, the expansion portion 73 can be removed by polishing to manufacture the nozzle plate 10 (FIG. 7C).

First Modification

FIG. 9 is a cross-sectional view illustrating the nozzle plate 10 according to a first modification of the present embodiment.

As illustrated in FIG. 9, in the present embodiment, a nozzle hole 11 of the nozzle plate 10 may include a first substrate 10*a* having a first flow path 12 and a second substrate 10*b* having a second flow path 13. At this time, the first flow path 12 is a through hole formed in the first substrate 10*a*, and the second flow path 13 is a through hole formed in the second substrate 10*b*. Thus, since the nozzle plate 10 can be manufactured by forming the first flow path 12 and the second flow path 13 separately and independently, the first flow path 12 and the second flow path 13 can be simply formed. Further, as compared with the case where the first flow path 12 and the second flow path 13 are integrally formed, the dimensions and shapes of the respective flow paths can be formed with high accuracy, so that variations due to manufacturing and processing can be made less likely to occur.

The material contained in the first substrate 10*a* is not particularly limited, and is, for example, stainless steel, copper, silicon, polyimide resin, or the like.

The material contained in the second substrate 10*b* is not particularly limited, and is, for example, stainless steel, copper, silicon, polyimide resin, or the like. Among them, the second substrate 10*b* is preferably made of stainless steel. Thus, the nozzle hole 11 can be suppressed from being damaged by the operation of wiping the ink carried out after using the inkjet bead 1, and thus deterioration of the discharge stability due to the damage of the nozzle hole 11 can be more sufficiently suppressed. From the above viewpoint, the surface of the second substrate 10*b* on the most downstream side in the discharge direction of the droplet is more preferably made of stainless steel.

Second Modification

Figure 10:
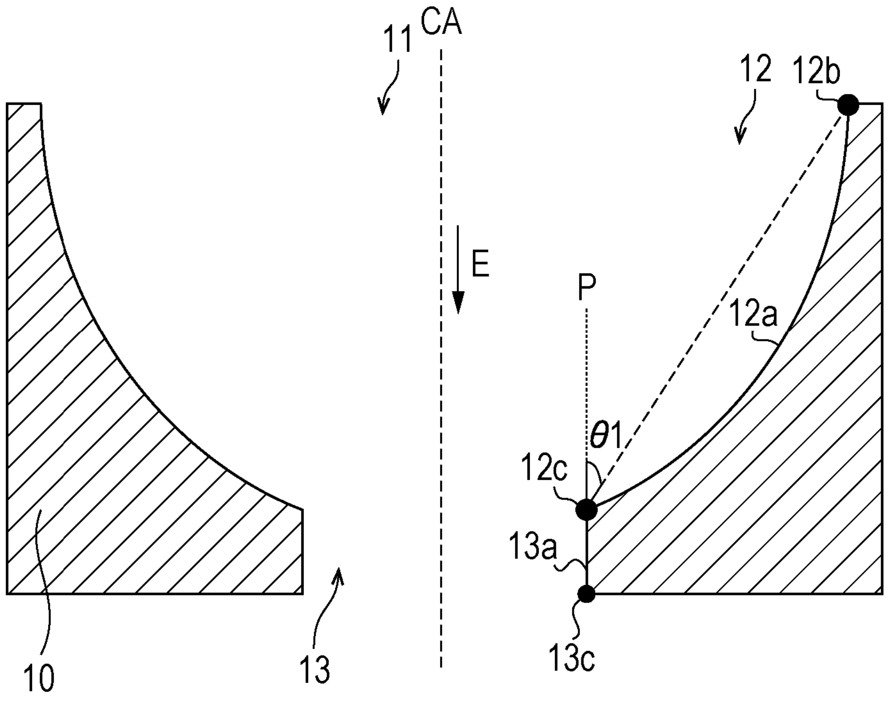
FIG. 10 is a cross-sectional view illustrating a nozzle plate according to a second modification of the present embodiment.

FIG. 10 is a cross-sectional view illustrating the nozzle plate 10 according to a second modification of the present embodiment.

As illustrated in FIG. 10, in the present embodiment, the first flow path 12 of the nozzle plate 10 may have a round shape in which the cross-sectional area orthogonal to the discharge direction on the most upstream side in the discharge direction of the droplets is larger than the orthogonal cross-sectional area on the most downstream side. When the first flow path 12 has such a shape, a larger volume can be ensured as compared with a case where the first flow path has a tapered shape, so that air entrained at the time of drawing a droplet is less likely to reach the pressure chamber 21, and discharge stability can be further improved.

Such the nozzle plate 10 can be manufactured by, for example, punching, isotropic etching, sand blasting, laser processing, or the like.

EXAMPLES (Evaluation of air entrainment)

For the piezoelectric inkjet head using the nozzle plate having the first flow path and the second flow path having shapes similar to those of the nozzle plate 10 illustrated in FIG. 4 and satisfying the conditions presented in Table 1 in the nozzle plate 10 in the present embodiment, simulation (experiment nos. 1 to 32) was performed using general-purpose three-dimensional thermal fluid analysis software (FLOE-3D, manufactured by FLOW Science Sceince), and the behavior of the air in the nozzle at the time of drawing the ink was observed. Conditions related to ink physical property values were set so that the density is 980 kg/m$^3$, the viscosity is 0.010 kg/m·s, the compression ratio is $5.88\times10^{-10}$, and the ink was not heated. Then, the positions of the discharge ports of the nozzle hole in the discharge direction of the ink droplet were set to z=0, and the fluid distribution existing in the region of z≥0 was calculated and visualized by the above simulation.

On the basis of the results obtained in the simulation, the air entrainment that occurs at the time of drawing the ink in the nozzle hole was evaluated according to the following criteria. The evaluation results are illustrated in Table 1.

(Evaluation Criteria)

o: It was confirmed that the air did not reach the inside of the pressure chamber when the ink was drawn.

x: It was confirmed that the air reached the inside of the pressure chamber when the ink was drawn.

TABLE 1

| No. | $L_A$ [μm] | $L_B$ [μm] | $R_x$ [μm] | θ1 [°] | $S_A$ [μm$^2$] | $S_B$ [μm$^2$] | $L_A + L_B$ [μm] | $L_A/R_X$ | $L_B/R_X$ | $L_B/L_A$ | $S_A/S_B$ | Evaluation |
|---|---|---|---|---|---|---|---|---|---|---|---|---|
| 1 | 65 | 5 | 40.5 | 15 | 3764.6 | 202.5 | 70 | 1.60 | 0.12 | 0.08 | 18.6 | ○ |
| 2 | 55 | 5 | 40.5 | 8 | 2652.6 | 202.5 | 60 | 1.36 | 0.12 | 0.09 | 13.1 | ○ |
| 3 | 75 | 5 | 40.5 | 8 | 3828.0 | 202.5 | 80 | 1.85 | 0.12 | 0.07 | 18.9 | ○ |
| 4 | 95 | 5 | 40.5 | 8 | 5115.9 | 202.5 | 100 | 2.35 | 0.12 | 0.05 | 25.3 | ○ |
| 5 | 115 | 5 | 40.5 | 8 | 6516.2 | 202.5 | 120 | 2.84 | 0.12 | 0.04 | 32.2 | ○ |
| 6 | 55 | 5 | 40.5 | 8 | 2652.6 | 202.5 | 60 | 1.36 | 0.12 | 0.09 | 13.1 | ○ |
| 7 | 55 | 5 | 40.5 | 10 | 2760.9 | 202.5 | 60 | 1.36 | 0.12 | 0.09 | 13.6 | ○ |
| 8 | 55 | 5 | 40.5 | 12 | 2870.5 | 202.5 | 60 | 1.36 | 0.12 | 0.09 | 14.2 | ○ |
| 9 | 55 | 5 | 40.5 | 15 | 3038.0 | 202.5 | 60 | 1.36 | 0.12 | 0.09 | 15.0 | ○ |
| 10 | 55 | 5 | 40.5 | 19 | 3269.1 | 202.5 | 60 | 1.36 | 0.12 | 0.09 | 16.1 | ○ |
| 11 | 55 | 5 | 20.0 | 5 | 1364.7 | 100.0 | 60 | 2.75 | 0.25 | 0.09 | 13.6 | ○ |
| 12 | 55 | 5 | 20.0 | 15 | 1910.5 | 100.0 | 60 | 2.75 | 0.25 | 0.09 | 19.1 | ○ |
| 13 | 55 | 5 | 20.0 | 20 | 2201.0 | 100.0 | 60 | 2.75 | 0.25 | 0.09 | 22.0 | ○ |
| 14 | 55 | 5 | 50.0 | 10 | 3283.4 | 250.0 | 60 | 1.10 | 0.10 | 0.09 | 13.1 | ○ |
| 15 | 55 | 5 | 50.0 | 15 | 3560.5 | 250.0 | 60 | 1.10 | 0.10 | 0.09 | 14.2 | ○ |
| 16 | 55 | 5 | 50.0 | 20 | 3851.0 | 250.0 | 60 | 1.10 | 0.10 | 0.09 | 15.4 | ○ |
| 17 | 70 | 5 | 20.0 | 15 | 2713.0 | 100.0 | 75 | 3.50 | 0.25 | 0.07 | 27.1 | ○ |
| 18 | 70 | 5 | 50.0 | 15 | 4813.0 | 250.0 | 75 | 1.40 | 0.10 | 0.07 | 19.3 | ○ |
| 19 | 70 | 5 | 20.0 | 8 | 2088.7 | 100.0 | 75 | 3.50 | 0.25 | 0.07 | 20.9 | ○ |
| 20 | 70 | 5 | 50.0 | 8 | 4188.7 | 250.0 | 75 | 1.40 | 0.10 | 0.07 | 16.8 | ○ |
| 21 | 69 | 1 | 40.5 | 15 | 4070.2 | 40.5 | 70 | 1.70 | 0.02 | 0.01 | 100.5 | ○ |
| 22 | 59 | 1 | 40.5 | 20 | 3656.5 | 40.5 | 60 | 1.46 | 0.02 | 0.02 | 216.1 | ○ |
| 23 | 65 | 7 | 40.5 | 15 | 3764.6 | 283.5 | 72 | 1.60 | 0.17 | 0.11 | 13.3 | ○ |
| 24 | 70 | 7 | 40.5 | 15 | 4148.0 | 283.5 | 77 | 1.73 | 0.17 | 0.10 | 14.6 | ○ |
| 25 | 80 | 7 | 40.5 | 15 | 4954.9 | 283.5 | 87 | 1.98 | 0.17 | 0.09 | 17.5 | ○ |
| 26 | 15 | 5 | 40.5 | 8 | 639.1 | 202.5 | 20 | 0.37 | 0.12 | 0.33 | 3.2 | x |
| 27 | 35 | 5 | 40.5 | 8 | 1589.7 | 202.5 | 40 | 0.86 | 0.12 | 0.14 | 7.9 | x |
| 28 | 55 | 5 | 40.5 | 3 | 2386.0 | 202.5 | 60 | 1.36 | 0.12 | 0.09 | 11.8 | x |
| 29 | 55 | 5 | 40.5 | 5 | 2492.2 | 202.5 | 60 | 1.36 | 0.12 | 0.09 | 12.3 | x |
| 30 | 55 | 5 | 50 | 5 | 3014.7 | 250 | 60 | 1.10 | 0.10 | 0.09 | 12.1 | x |
| 31 | 40 | 5 | 20 | 15 | 1228.7 | 100 | 45 | 2.00 | 0.25 | 0.13 | 12.3 | x |
| 32 | 40 | 5 | 50 | 15 | 2428.7 | 250 | 45 | 0.80 | 0.10 | 0.13 | 9.7 | x |

TABLE 1-continued

| No. | $L_A$ [μm] | $L_B$ [μm] | $R_x$ [μm] | θ1 [°] | $S_A$ [μm$^2$] | $S_B$ [μm$^2$] | $L_A + L_B$ [μm] | $L_A/R_X$ | $L_B/R_X$ | $L_B/L_A$ | $S_A/S_B$ | Evaluation |
|---|---|---|---|---|---|---|---|---|---|---|---|---|
| 33 | 40 | 5 | 20 | 8 | 1024.9 | 100 | 45 | 2.00 | 0.25 | 0.13 | 10.2 | x |
| 34 | 40 | 5 | 50 | 8 | 2224.9 | 250 | 45 | 0.80 | 0.10 | 0.13 | 8.9 | x |

(Evaluation of Discharge Stability)

In a nozzle plate satisfying the conditions of Experiment Nos. 1, 2, 7, and 13 in Table 1, a punch having a shape similar to that of the punch 72 in the present embodiment was press-fitted into the plate placed on a die, and was then taken out from the plate. The expansion portion formed by press fitting of the punch was removed by polishing to manufacture the nozzle plates A to D. The nozzle plates A to D were attached to and adhered to a piezoelectric inkjet head.

The inkjet head was filled with a solvent-based ink (colorless, viscosity: 0.010 kg/m·s, manufactured by Konica Minolta Mechatronics Co., Ltd.), the discharge speed of the ink droplets was adjusted to 9 m/s, and then the piezoelectric element was driven at a frequency of 11.4 kHz and discharged continuously for 5 minutes.

The discharge stability of the ink droplets was evaluated according to the following criteria.

o Discharge disturbance or nozzle missing is not confirmed during discharge of the ink droplet, and the droplet has landed at a predetermined position.

x Discharge disturbance or nozzle missing is confirmed during discharge of ink droplets, and the droplets cannot land at a predetermined position.

The evaluation results are presented in Table 2.

TABLE 2

| Nozzle | $L_A$ [μm] | $L_B$ [μm] | $R_x$ [μm] | θ1 [°] | $S_A$ [μm$^2$] | $S_B$ [μm$^2$] | $L_A + L_B$ [μm] | $L_A/R_X$ | $L_B/R_X$ | $L_B/L_A$ | $S_A/S_B$ | Evaluation |
|---|---|---|---|---|---|---|---|---|---|---|---|---|
| A | 65 | 5 | 40.5 | 15 | 3764.6 | 202.5 | 70 | 1.60 | 0.12 | 0.08 | 18.6 | ○ |
| B | 55 | 5 | 40.5 | 8 | 2652.6 | 202.5 | 60 | 1.36 | 0.12 | 0.09 | 13.1 | ○ |
| C | 55 | 5 | 40.5 | 10 | 2760.9 | 202.5 | 60 | 1.36 | 0.12 | 0.09 | 13.6 | ○ |
| D | 55 | 5 | 40.5 | 19 | 3269.1 | 202.5 | 60 | 1.36 | 0.12 | 0.09 | 16.1 | ○ |

INDUSTRIAL APPLICABILITY

A nozzle plate, an inkjet head, and an image formation device according to the present invention are useful in the field of image formation and the like, for example, because discharge stability of droplets can be enhanced.

REFERENCE SIGNS LIST

1 Inkjet head
2 Common ink chamber
2*a* Ink supply port
2*b* Ink discharge port
3 Holding unit
3*a* Opening
4 Head chip
5 Flexible wiring board
10 Nozzle plate
10*a* First substrate
10*b* Second substrate
11 Nozzle hole
12 First flow path
12*a*, 13*a* Wall surface
13 Second flow path
14 Liquid-repellent film
20 Pressure chamber forming plate
21 Pressure chamber
22 Diaphragm
23 Partition wall
23*a* First partition wall member
23*b* Second partition wall member
24 Second communication hole
30 Drive plate
31 Space
32 Third communication bole
40 Wiring substrate
41 Wiring layer
41*a* Solder
42 Silicon layer
43 Fourth communication hole
50 Actuator
51 Piezoelectric element
52 First electrode
53 Second electrode
100 Image formation device
110 Ink supplying device
120 Conveyance device
121 Bell conveyor
122 Feed roller
123*a* Pulley
130 Main tank
141, 144 Pipe
143 Bypass pipe
142 Valve

The invention claimed is:

1. A nozzle plate comprising a nozzle hole for discharging a droplet, wherein the nozzle hole includes a first flow path, and a second flow path disposed in such a manner as to communicate with the first flow path on a downstream side of the first flow path with respect to a discharge direction of the droplet;

in the first flow path, a cross-sectional area orthogonal to the discharge direction on a most upstream side in the discharge direction is larger than a cross-sectional area orthogonal to the discharge direction on a most downstream side;

in a cross section including a center axis of the nozzle hole and parallel to the discharge direction;

an inclination of a straight line connecting an end on the most upstream side and an end on the most downstream side of a wall surface of the second flow path disposed on one side with respect to the center axis with respect to the discharge direction is smaller than an inclination of a straight line connecting an end on the most upstream side and an end on the most downstream of the wall surface of the first flow path disposed on the one side with respect to the discharge direction;

a minimum cross-sectional area $S_A$ of the first flow path and a minimum cross-sectional area $S_B$ of the second flow path satisfy a relationship of expression (1);

a length $L_A$ of the first flow path in the discharge direction, a length $L_B$ of the second flow path in the discharge direction, and a minimum width $R_x$ of the second flow path on a most downstream side in the discharge direction in a direction orthogonal to the discharge direction satisfy relations represented by expressions (2) and (3); and the length $L_B$ of the second flow path in the discharge direction is less than 0.1 times the length $L_A$ of the first flow path in the discharge direction, $$S_A > 13S_B \tag{1}$$

$$L_A \leq 2R_X \tag{2}$$

$$L_B < 1/2R_X. \tag{3}$$

2. The nozzle plate according to claim 1, wherein a cross-sectional shape of the nozzle hole on a most downstream side in a discharge direction of the droplet orthogonal to the discharge direction is circular.

3. The nozzle plate according to claim 2, wherein the first flow path has a tapered shape.

4. The nozzle plate according to claim 2, wherein in the second flow path, an area of a cross section orthogonal to the discharge direction is constant in the discharge direction.

5. The nozzle plate according to claim 2, wherein a sum of the length $L_A$ of the first flow path in the discharge direction and the length $L_B$ of the second flow path in the discharge direction is equal to or more than 60 μm.

6. The nozzle plate according to claim 1, wherein the first flow path has a tapered shape.

7. The nozzle plate according to claim 1, wherein in the second flow path, an area of a cross section orthogonal to the discharge direction is constant in the discharge direction.

8. The nozzle plate according to claim 1, wherein a sum of the length $L_A$ of the first flow path in the discharge direction and the length $L_B$ of the second flow path in the discharge direction is equal to or more than 60 μm.

9. The nozzle plate according to claim 1, wherein the length $L_B$ of the second flow path in the discharge direction is equal to or more than 1 μm.

10. The nozzle plate according to claim 1, wherein in a cross section including a center axis of the nozzle hole and parallel to the discharge direction, the inclination of the wall surface of the first flow path is equal to or more than 5° and equal to or less than 20°.

11. The nozzle plate according to claim 1, wherein a substrate including a surface on a most downstream side in the discharge direction is made of stainless steel.

12. The nozzle plate according to claim 1, wherein the first flow path and the second flow path are formed by processing one substrate.

13. The nozzle plate of claim 1, further comprising:

a first substrate including the first flow path; and a second substrate including the second flow path.

14. The nozzle plate according to claim 1, wherein the nozzle plate is used in an inkjet head.

15. An inkjet head comprising the nozzle plate according to claim 1.

16. An image formation device comprising the inkjet head according to claim 15.

* * * * *